Dec. 29, 1925.
Re. 16,236
F. B. CROSBY
WIRE DRAWING MACHINE
Original Filed August 7, 1920 2 Sheets-Sheet 1
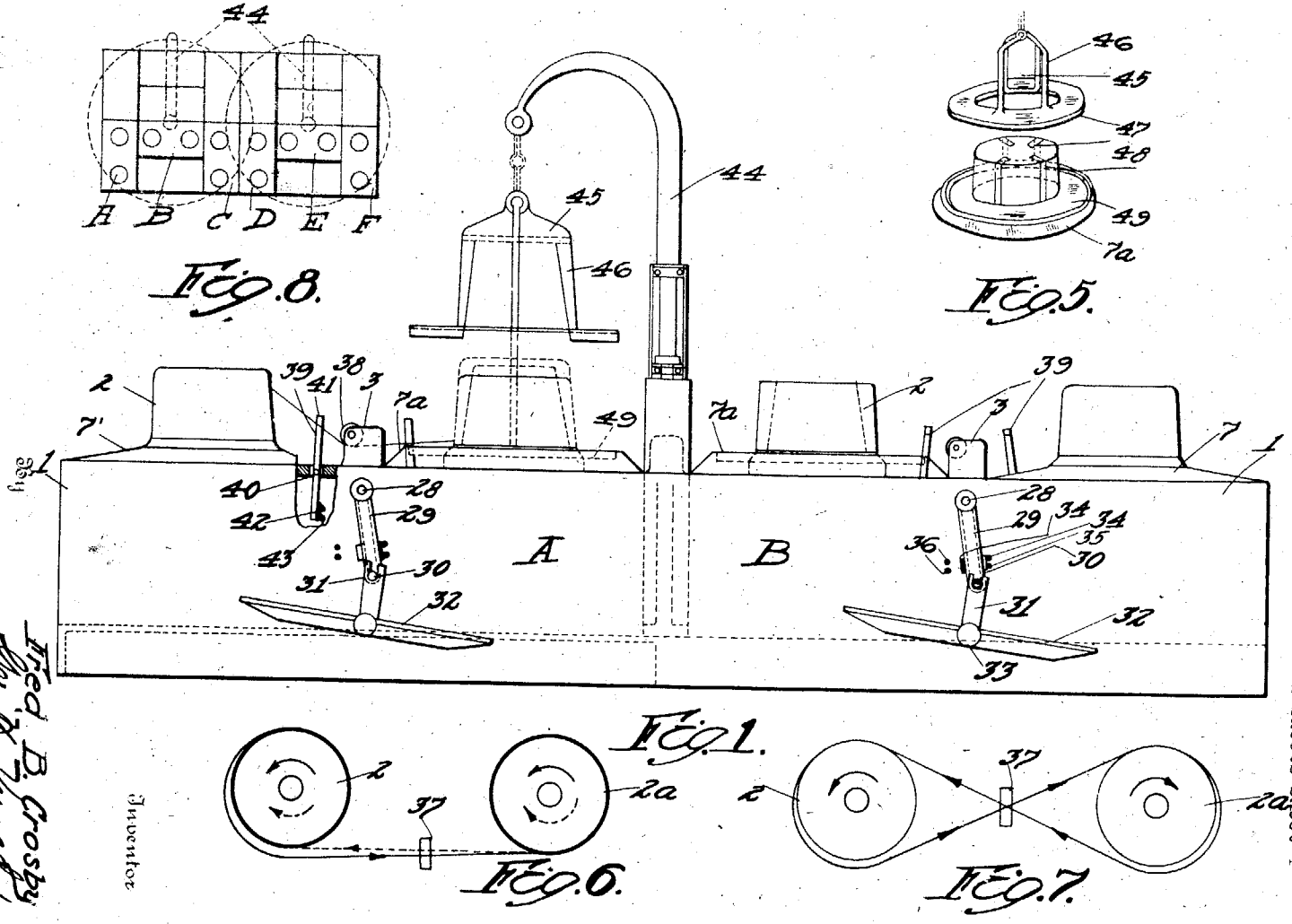
Inventor
By Fred. B. Crosby
Geo. H. Kennedy
Attorney Dec. 29, 1925.

Re. 16,236

F. B. CROSBY

WIRE DRAWING MACHINE

Original Filed August 7, 1920 2 Sheets-Sheet 2

Inventor

Fred B. Crosby

By Geo. H. Kennedy Jr.

Attorney

Reissued Dec. 29, 1925. Re. 16,236

UNITED STATES PATENT OFFICE.

FRED B. CROSBY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

WIRE-DRAWING MACHINE.

Original No. 1,482,348, dated January 29, 1924, Serial No. 401,840, filed August 7, 1920. Application for reissue filed August 7, 1925. Serial No. 48,907.

*To all whom it may concern:*

Be it known that I, FRED B. CROSBY, a citizen of the United States, residing at Worcester, in the county of Worcester and Commonwealth of Massachusetts, have invented a new and useful Improvement in a Wire-Drawing Machine, of which the following, together with the accompanying drawings, is a specification.

My invention relates to wire drawing machines of the type in which a rotating drum or block is employed, whereon the wire is wound as it is drawn through a reducing die.

The objects of my invention are to provide an improved form of wire drawing block and to provide a novel arrangement of parts in connection therewith, whereby the blocks may be operated in units to obtain the most useful and efficient results for the wire drawing installation, as a whole. More particularly my invention contemplates a reversible wire drawing unit comprising a pair of blocks each adapted for selective and alternate connection to a suitable common driving means so that either block of the pair may function as a draft device or as a supply means. These and other advantageous features of my invention will hereinafter more fully appear, reference being had to the accompanying drawings, in which—

Figure 1 is a view in side elevation showing a plurality of my improved wire drawing blocks arranged in units in accordance with my invention.

Figure 5 is a perspective view showing the details of the coiling cage used in connection with one of the wire drawing blocks.

Figures 6 and 7 are diagrammatic views showing the different ways of drawing wire on a single unit.

Figure 8 is a diagrammatic view showing the arrangement of a plurality of wire drawing units.

Similar reference characters refer to similar parts throughout the different figures.

Referring to Fig. 1, there are shown a pair of wire drawing units A and B, each of which comprises a bench 1, upon the top of which are mounted wire drawing blocks 2. Projections 3 are provided between each pair of blocks 2 for supporting suitable drawing dies, which will be hereinafter referred to. A bench 1 with a pair of blocks 2, together with the apparatus for driving the same, constitutes a single unit, and as each unit is substantially the same in construction, only one unit need be described in detail.

Figure 3:
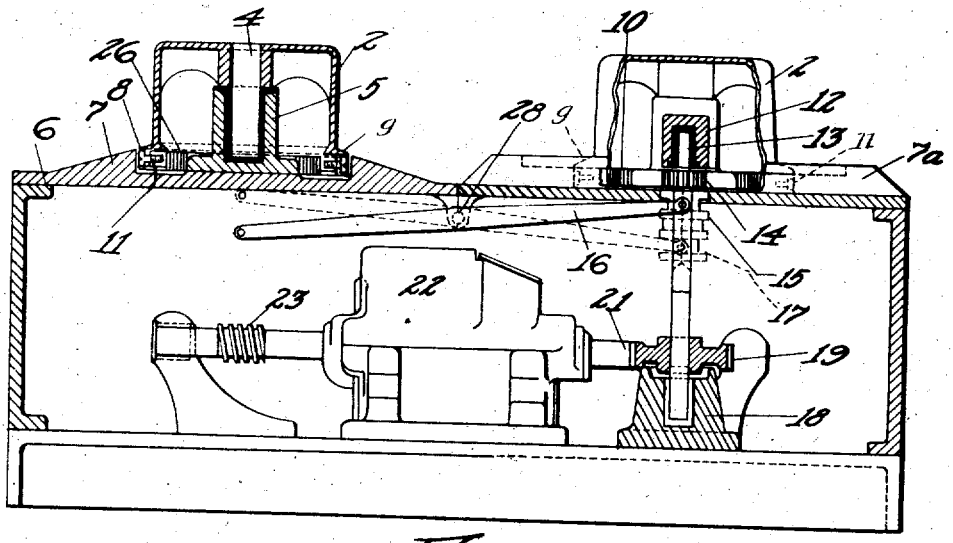
Figure 3 is a sectional view along the line 3—3 of Fig. 2.
Figure 2:
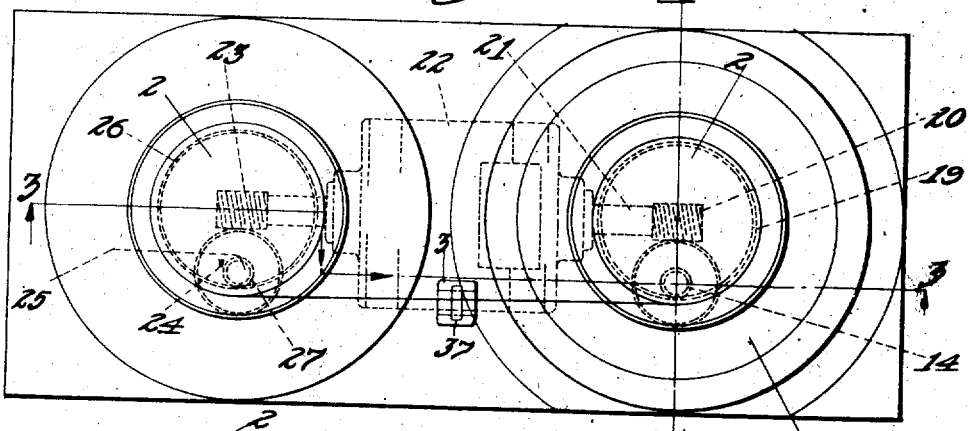
Figure 2 is a plan view of one of the units shown in Fig. 1.
Figure 4:
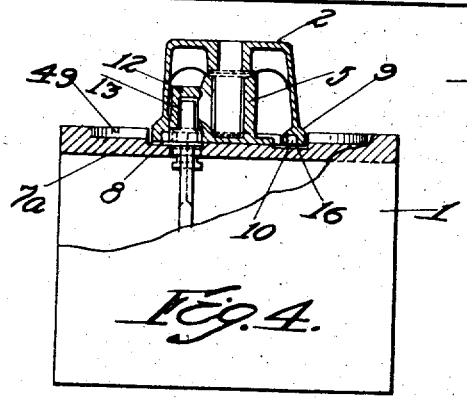
Figure 4 is a partial sectional view along the line 4—4, Fig. 2.

Referring now to Figs. 2, 3 and 4, each block 2 is provided with a vertical arbor 4 that is rotatably supported in a pedestal 5 secured to the top plate 6 of bench 1. The top plate 6 is provided with annular projections 7 and 7[a] that are counter sunk, as indicated at 8, to receive a flange 9 at the base of each block 2. An internal gear 10 is secured to the flange 9 of the right hand block by set screws 11 as shown in dotted lines, or any other suitable retaining means.

As best shown in Fig. 4, each pedestal 5 is provided with a laterally extending portion 12, within which is journalled the upper end of a countershaft. A pinion 14 is carried by a collar 15 slidably mounted on the right hand countershaft 13 and adapted to rotate therewith. The pinion 14 is in mesh with the internal gear 10 in its upper position, and is adapted to be moved out of engagement therewith by means of a lever 16, the end of which engages an annular groove 17 provided on the collar 15. The lower end of the countershaft 13 is supported in a pedestal bearing 18 and is provided with a spiral gear 19. The gear 19 is in mesh with a spiral pinion 20 carried at one end of a rotatable driving member, here shown as the armature shaft 21 of an electric motor 22. The other end of the armature shaft 21 is similarly provided with a spiral pinion 23 that is in mesh with a spiral gear 24 carried on the left hand countershaft 25 extending upwardly into the left hand block 2. The left hand block 2 is provided with an internal gear 26, also secured by set screws 11 that is adapted to be engaged by a pinion 27 slidably mounted on the countershaft 25 in the same manner as the pinion 14 of the right hand countershaft 13.

The lever 16 is pivotally mounted on a shaft 28 and its left hand end is in engagement with the collar, not shown, which carries the pinion 27. The shaft 28 projects outside the wall of the bench 1 and is provided with a rocker arm 29 having a projection 30 at its lower end, that is adapted to be embraced by a yoke 31 projecting upwardly from a foot pedal 32. The foot pedal 32 is pivotally mounted at 33 and is adapted to be depressed from either side of its pivotal point. When the right hand side of the pedal 32 is depressed, as shown in the drawing, the lever 16 is turned about its pivot in a counterclockwise direction to move the pinion 14 into mesh with the internal gear 10 of the right hand block 2, while the pinion 27 is held out of mesh with the gear 26 of the left hand block. It is obvious that when the foot pedal 32 is depressed on the left hand side, the left hand block 2 will be connected to the motor, while the right hand block remains idle. When the foot pedal 32 is left in a substantially horizontal position, the lever 16 will hold both pinions 14 and 27 out of engagement with their respective internal gears 10 and 26.

The rocker arm 29 is provided with a pair of contact plates 34 on opposite sides thereof that are adapted to engage respective pairs of contact members 35 and 36 when the foot pedal 32 is in either of its depressed positions. Each pair of contact members 35 and 36 is connected in the electrical control circuit of the motor 22 so that the circuit remains open when the foot pedal is in its intermediate or horizontal position and the motor cannot be started. When, however, the foot pedal 32 is depressed, either contact plate 34 is adapted to bridge a pair of contact members and so make it possible to start the motor.

A wire drawing die 37 is mounted on the projection 3 between the drawing blocks 2, and a guide wheel 38 is mounted directly above the die opening in order to direct the wire therethrough. A switch lever 39, pivotally mounted on the top plate 6 at 40, is provided at its upper end with an opening 41, through which the wire is adapted to pass on its way through the die 37. The lower end of the lever 39 is provided with a contact arm 42 that is normally adapted to bridge a pair of contact members 43 also connected in the control circuit of the motor 22. As long as the wire is passing through the die properly, the lever 39 remains in the position shown, but upon the occurrence of a kink, or in event of the wire becoming entangled with the hand or arm of the operator, the lever 39 is turned about its pivot to interrupt the circuit between the contact members 43 and so stop the motor 22. The switch levers 39 are placed on both sides of the projection 3, so as to receive wire coming in either direction to the die 37.

Referring again to Fig. 1, a suitable derrick or hoist 44 is pivotally mounted between the wire drawing units A and B, and is provided with means for raising and lowering a coiling cage 45 and swinging it clear of the benches 1. As best shown in Fig. 5, the cage 45 comprises a plurality of ribs 46, converging at the top and secured together at the bottom by a ring 47. Each wire drawing block 2 is provided with a plurality of slots 48 arranged to receive the ribs 46 of the cage 45 and to permit the cage to be lowered upon the block. The projection $7^a$ above which the block is adapted to turn is provided with a depression 49 to receive the ring 47 when the cage is lowered upon the block. In this position of the cage 45, the block presents an unbroken periphery so that the wire may be coiled smoothly thereon. When a complete coil has been drawn onto the block, the ribs 46 of the cage are completely surrounded by the coil, so that when the cage is lifted off the block by means of the hoist 44, the ring 47 of the cage will strip the coil from the block. The completed coil may then be deposited on the floor beside the benches 1, or may be placed upon an adjacent block for further drawing. Obviously the cage 45 may be used in connection with a hoist carried by an overhead conveyor extending above a number of drawing block units.

Referring now to Fig. 6, there is shown diagrammatically, the direction of travel of the wire when one block of a given unit is driven in a given direction of rotation by the motor. In this case, the metal is first drawn off of one side of the block 2 onto the same side of block $2^a$ and then, by reversing the motor, off of block $2^a$ onto the same side of block 2. This reverses the travel of the wire through the die 37 which, it has been found, tends to eliminate slivers and breakages of the wire.

When it is desired to draw from one block to another, without changing the direction of travel the blocks 2 and $2^a$ are arranged to be driven in opposite directions of rotation by the motor. This may be readily accomplished by employing right and left hand spiral pinions on the armature shaft of the motor. The die 37 is placed midway between the blocks with this arrangement, as indicated in Fig. 7, and the wire is drawn off of one side of block 2 onto the opposite side of block $2^a$, the wire being drawn down from the top of the free block. The end first drawn onto the block $2^a$ is then drawn down from the top of the other side of block $2^a$ onto the opposite side of block 2, without reversing its direction of travel through the die, and without reversing the motor. With this arrangement it is always necessary to draw down from the top of the bundle on the free block, the strands not being permitted to cross.

From the foregoing, it is apparent that my arrangement of the blocks in units is particularly advantageous from an operating standpoint, for the reason that a single unit may be used successively for successive drafts, employing first one block as a drawing means, and then the other. Also, my arrangement is such that when either one of the blocks 2 is connected to the driving means, the other block is automatically disconnected from and positively maintained in an inoperative condition with respect to said driving means; consequently there is no chance of both blocks being accidentally connected to the driving means at the same time. In addition, the unit construction results in a standardized product that can be manufactured in quantity on a very economical basis. The individual motor drive for each unit is also very desirable from an operating standpoint, for the reason that the failure of a motor will shut down only one unit of the entire installation, and only such blocks as are in actual use need be operated, thus reducing stand-by power losses.

The separate units are readily arranged in any desired relation to each other, which results in a greater economy of building space than has been possible heretofore with a large number of blocks arranged side by side upon a single bench. It is obvious that the units can be assembled together to provide either a continuous bench, or any desired geometrical arrangement, such as is shown in Fig. 8. Here the several wire drawing units A, B, C, D, etc., are arranged so that a single hoist is adapted to serve twelve blocks, all of which are readily accessible to the operators from all sides. This arrangement, in itself, provides a greater degree of safety for the operators, due to the elimination of blades and loose wire from the floor and the provision of clear passageways around the units. The operation of the units with a coiling cage and a hoist also results in increased tonnage for the installation, due to the saving of time previously lost in lifting coils on and off the blocks after each draft. This heavy lifting has heretofore required the employment of men of exceptionally strong physique to the exclusion of otherwise skillful operators. It is obvious that either individual jib cranes or overhead travelling hoists can be employed to serve any desired grouping of the units.

In the actual drawing operation, the use of an adjustable speed electric motor for each pair of blocks permits the successive drafts to be carried on at the highest practical speed and with a maximum output. The motor control can also be designed to give the proper torque characteristics and thereby minimize the strain on the wire and dies at starting. The employment of individual adjustable speed electric motors also results in a flexibility of control not heretofore obtained, for the motors are arranged to be automatically stopped in case the wire snarls before entering the die, and are adapted to be started with automatic control only when either block of a unit is connected to the motor by the gearing. The simple mechanical construction of each unit permits lifting each block off its driving mechanism for examination and repair, and also permits the ready inspection of the electric motor by lifting off the top plate of a unit.

A further advantage of my arrangement for driving the blocks lies in the fact that the pinions for driving the same apply the driving force or the periphery of the drum, at substantially the point where the wire is drawn on the drum. This minimizes the strains caused by the draft and permits a very light weight block to be employed.

From the foregoing, it is apparent that by my invention I have provided an improved reversible two-block wire drawing unit whose operation is far superior to ordinary single-block drawing by reason of the fact that first one block and then the other may be employed as a draft device, alternately with its use as a supply means or reel, thereby avoiding the necessity for removing and handling the wire between successive drafts. Furthermore, my improved mechanism is adapted to be arranged so as to occupy a minimum amount of floor space, the blocks of each unit being so constructed and driven as to reduce the weight of the parts and the power necessary for driving the same, all as previously pointed out herein.

I claim,

1. A wire drawing unit comprising a bench, a pair of blocks mounted on the top of said bench, a die located between said blocks, a separate source of power located within said bench, and means for selectively connecting said blocks to said source of power to draw wire through said die in either direction.

2. A wire drawing unit comprising a bench, a pair of blocks mounted on the top of said bench, a die located between said blocks, a separate source of power located within said bench, and means for selectively connecting said blocks to said source of power, whereby either of said blocks may function as a drawing means or as a supporting means for the material being drawn through said die.

3. A wire drawing unit comprising a bench, a pair of blocks mounted on the top of said bench, a die located between said blocks, a separate source of power located within said bench, and means for selectively connecting said blocks to said source of power, whereby both blocks may be employed continuously for successive drafts through said die with either block functioning as a drawing means.

4. In a wire drawing machine, a bench, a pair of blocks mounted on top of the bench, a die located between said blocks, an electric motor located within the bench, and means for operatively connecting, or disconnecting, either of said blocks to said motor to draw wire through said die in either direction.

5. In a wire drawing machine, a bench, a pair of blocks mounted on top of the bench, a die located between said blocks, an electric motor located within the bench, gearing for operatively connecting the armature shaft of said motor to either of said blocks, and means for selectively controlling the arrangement of said gearing, whereby only one of said blocks can be connected to said motor at one time to draw wire through said die.

6. In a wire drawing machine, a bench, a pair of blocks mounted on top of the bench, a die located between said blocks, an electric motor located within the bench, gearing adapted to connect the armature shaft of said motor to said blocks, and means for preventing the starting of said motor until one of said blocks is connected to said motor shaft to draw wire through said die.

7. In a wire drawing machine, the combination with a bench having a pair of blocks mounted on the top thereof, an electric motor located within the bench for driving either of said blocks, and a drawing die positioned between said blocks, of means for automatically stopping said motor upon snarling of the wire before it enters the die.

8. In a wire drawing machine, the combination with a bench having a pair of blocks mounted on the top thereof, an electric motor located within the bench for driving either of said blocks, and a drawing die positioned between said blocks, of a switch arm located between the die and the block supporting the material being drawn for automatically stopping the motor upon the occurrence of a snarl in the wire.

9. In a wire drawing machine, a bench, a pair of blocks mounted on top of said bench and each provided with an internal gear, a source of power located within said bench, a countershaft extending upwardly within each block and connected to said source of power, and a pinion slidably mounted on each countershaft for connecting each block to the source of power through its internal gear.

10. In a wire drawing machine, a bench, a pair of blocks mounted on top of said bench, and each provided with an internal gear, a source of power located within said bench, a countershaft extending upwardly within each block and connected to said source of power, a pinion slidably mounted on each countershaft, and means for simultaneously shifting said pinions on said countershafts to mesh one of said pinions with the internal gear on one of said blocks while the other pinion remains out of mesh with the other internal gear.

11. In a wire drawing machine, the combination with a rotatable block provided with a plurality of slots in the periphery thereof, and an annular depression at the base of said slots, of a coiling cage for said block provided with ribs fitting in said slots, and an annular plate connecting said ribs and receivable in said depression.

12. In a wire drawing machine, the combination with a rotatable block provided with a plurality of slots in the periphery thereof, and an annular depression at the base of said slots, of a cage having ribs adapted to fit in said slots to provide a continuous periphery for the formation of a coil on said block, and an annular plate receivable in said depression to be flush with the base of said block.

13. In a wire drawing machine, a bench, a pair of blocks mounted on top of said bench and each having a drum portion, a die located between said blocks, and means for applying a driving force to either of said blocks at substantially the point on the periphery of its drum portion where the wire is drawn thereon from said die.

14. In a wire drawing machine, a block rotatably mounted on a central shaft surrounded by an internal gear, and a countershaft extending upwardly within said block and connected to said gear by a pinion slidably mounted on said shaft.

15. In wire drawing apparatus of the class described, a pair of blocks, a die located therebetween, and means selectively operable to impart rotation to either of said blocks, thereby to draw wire through said die in either direction.

16. In wire drawing apparatus of the class described, a pair of blocks, a die located therebetween, a rotatably driven shaft and means for alternately connecting said blocks to said shaft to draw wire through said die, first in one direction and then in the other, one of said blocks being positively maintained out of operative connection with said shaft when the other block is connected thereto.

17. In wire drawing apparatus of the class described, a pair of blocks, rotation imparting mechanism, and means for selectively connecting said blocks to said rotation imparting mechanism, whereby either of said blocks may function as a drawing means, or as a supply means, for the material being drawn through a die located between said blocks.

18. In wire drawing apparatus of the class described, a pair of blocks, a die located therebetween rotation imparting mechanism, and means for selectively connecting said blocks to said rotation imparting mechanism whereby both blocks may be employed for successive drafts through said die with either block functioning as a drawing means.

19. In wire drawing apparatus, the combination with a pair of rotatably mounted blocks, of an interposed wire drawing die, and means for imparting rotation to said blocks alternately, whereby each block serves alternately as a draft device, to draw wire through said die, and as a supply device for the wire being drawn.

Dated this fourth day of August, 1925.

FRED B. CROSBY.